US006515098B1

(12) United States Patent
Hariharan et al.

(10) Patent No.: US 6,515,098 B1
(45) Date of Patent: Feb. 4, 2003

(54) VIBRATION DAMPING MONOLITHIC POLYMERS

(75) Inventors: Ramesh Hariharan, Malden, MA (US); Kathryn Lynn Longley, Saratoga Springs, NY (US); Gary Charles Davis, Albany, NY (US); Grant Hay, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/895,125

(22) Filed: Jul. 2, 2001

(51) Int. Cl.$^7$ ............................................... C08G 64/00
(52) U.S. Cl. ................... 528/196; 528/198; 264/176.1; 264/330; 347/101; 347/150; 347/306; 428/64.1; 428/64.7; 430/200; 430/264; 430/270.11; 503/201
(58) Field of Search .................. 528/196, 198; 347/101, 150, 306; 430/200, 264, 270.11; 503/201; 264/176.1, 330; 428/64.1, 64.7

(56) References Cited

U.S. PATENT DOCUMENTS

| 4,902,746 | A | * | 2/1990 | Serini et al. | ................. | 525/146 |
| 6,022,942 | A | * | 2/2000 | Ishiwa et al. | ................. | 347/101 |
| 6,177,537 | B1 | * | 1/2001 | Caruso et al. | ............ | 264/176.1 |
| 6,248,859 | B1 | * | 6/2001 | Caruso et al. | ............... | 528/196 |
| 6,255,438 | B1 | * | 7/2001 | Whitney et al. | ............. | 528/196 |
| 6,395,364 | B1 | * | 5/2002 | Davis et al. | ................ | 428/64.1 |

OTHER PUBLICATIONS

"Secondary Relaxation Motion in Bisphenol A Polycarbonate" by J.Y. Jho and A.F. Yee, Macromolecules 1991, 24, 1905–1913.

"Dielectric Study on β–relaxation Process of Tetramethyl––bisphenol–A Polycarbonate", S. Yagihara, M. Yamada, M. Asano, Y. Kanai, N. Shinyashiki, S. Mashimo, K.L. Ngai, Journal of Non–Crystalline Solids 235–237 (1998) (412–415).

"Dielectric Relaxation Spectroscopy of Amorphous and Liquid–Crystalline Side–Chain Polycarbonates", M. Wubbenhorst, E.M. VanKoten, J.C. Jansen, Wim Mijs, J. VanTurnhout, Macromol. Rapid Commun. 18, 139–147 (1997).

"On the Secondary Relaxation of Substituted Bis–A Polycarbonates", R. Wimberger–Friedl & H.F.M. Schoo, Macromolecules 1996, 29, 8871–8874.

Einfluβ der Temperatur auf die Zahigkeit, die Bruchflachenmorphologie und das molekulare Relaxationsverhalten von Polycarbonat, W. Grellman, R. Lach, Die Angewandte Makromolekulare Chemie 237 (1996) 191–208, (Nr. 4163).

"Einfluβ der chemischen Struktur auf die mechanischen Eigenschaften von modifizierten Polycarbonaten", G. Weymans, K. Berg, L. Morbitzer and U. Grigo, Die Angewandie Makromolekulare Chemie 162 (1988) 109–121 (Nr. 2754).

"Relaxations in Polymers Derived from Bisphenol–A", R. Diaz Calleja, D. Radic, L. Gargallo, Journal of Non–Crystalline Solids 172–174 (1994) 907–910.

* cited by examiner

Primary Examiner—Terressa M. Boykin
(74) Attorney, Agent, or Firm—Bernadette M. Bennett; Noreen C. Johnson

(57) ABSTRACT

The damping performance of an article and a polycarbonate composition is improved and a storage medium for data is provided with a glass transition temperature greater than about 150° C.

44 Claims, 2 Drawing Sheets

VIBRATION DAMPING MONOLITHIC POLYMERS

BACKGROUND OF THE INVENTION

The present invention relates to vibration damping materials comprising a polymer. The invention further relates to data storage medium prepared from the high glass transition temperature vibration damping materials.

Vibration damping is a common need in many mechanical systems where undesired resonances may be excited by normal perturbations. The suspension system in an automobile, for example, will exhibit large unwanted oscillations in response to road irregularities unless properly damped. Vibration dampers used in automobiles consist of springs providing shock and vibration isolation to a motor vehicle seat assembly.

Layers of elastomeric materials that absorb energy are other types of damping material. Polyethylene, polypropylene. non-conjugated dienes, rubber cross linkers and similar materials are used in these vibration systems. Composites of metal and polymer are employed on the outside of many computer hard disk drives to reduce the noise of the drive within the computer. Vibration dampers are also used in printed circuit boards and spindle motors in internal disk drive applications. In particular, vibration damping materials are used to guard the interior of a disk drive from external shock forces.

Due to a wide range of possible applications, there has been an intense research in polymer systems capable of damping out vibrations. Most polymer systems have a low fundamental vibration frequency. Many of these systems employ an elastomer in combination with a glassy polymer, metal, or combination thereof which are in contrast to single phase homogenous materials, i.e. monolithic systems. Monolithic polymers have the advantage of better surface smoothness. Thus, it would be desirable to develop damping systems which offer damping at room temperature without the use of a dispersed rubbery phase or blocky copolymer. "Blocky copolymer" as used herein refers to multiple phase polymer systems with alternating monomer sequences that may be of varying length.

One area in which there has been intense research in polymer systems capable of damping out vibrations is in "first surface" media. Unlike compact discs and digital video disks (DVD), storage medium having high areal density capabilities, typically greater than 5 Gigabits per square inch, employ first surface or near field read/write techniques in order to increase the areal density. "First surface" as used herein refers to the data layer which is on the surface of a substrate wherein an optic does not pass through the substrate. "Near field read/write techniques" as used herein refers to an optical mechanism wherein the numericai aperture is greater than about 1. For such storage media, although the optical properties are not relevant, the physical and mechanical properties of the substrate become increasingly important. For high areal density applications, including first surface applications, the surface quality of the storage medium can affect the accuracy of the reading device, the ability to store data, and replication qualitites of the substrate. Furthermore, the physical characteristics of the storage medium when in use can also affect the ability to store and retrieve data. For instance, if the axial displacement of the medium is too great, the axial displacement can inhibit the accurate retrieval of data and/or damage the read/write device. Thus, improved vibration performance may be achieved by either high modulus or high damping.

In addition to high damping, the storage medium should be capable of withstanding subsequent processing parameters, for example, application of subsequent layers such as sputtering (i.e. temperatures up to and exceeding about 200° C., typically up to or exceeding about 300° C.) for magnetic media, and temperatures of about 25° C. up to about 150° C. for magneto-optic media.

In the hard disk industry standard Cobalt-Chromium-Platinum (CoCrPt) longitudinal recording alloys are predominantly utilized as the sputtered medium. In the sputtering process the high substrate temperatures serve a few purposes. First, it tends to lead to lower-noise films. It is speculated that temperature promotes compositional segregation of grains by promoting the diffusion of chromium to grain boundaries. Lower noise films directly translate to the ability to support higher density recording by allowing one to maintain an acceptable signal to noise (S/N) with decreasing signal. The second major influence is that for these types of alloys, higher temperature (among other factors) tends to promote higher film coercivity. Higher coercivity promotes improved thermal stability and thus improves performance. Thus, it is desirable for the storage medium to have sufficient thermal stability to prevent deformation during the deposition steps.

Vibration concerns and thermal stability are critical in the design of data storage devices, such as optical disk drives and hard disk drives. Thus, there is a need to develop damping systems utilizing polymers which are suitable for use in data storage devices, in particular in substrate applications.

BRIEF SUMMARY OF THE INVENTION

The present invention provides a storage medium for data, the storage medium comprising:

1) a substrate comprising at least one polycarbonate portion, and
2) at least one data layer on the substrate;

the polycarbonate comprising at least one compound of structure, (I), (II), (III), or (IV):

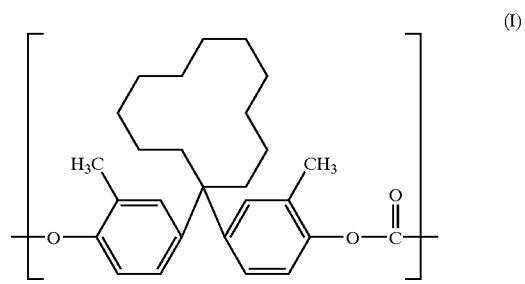

-continued

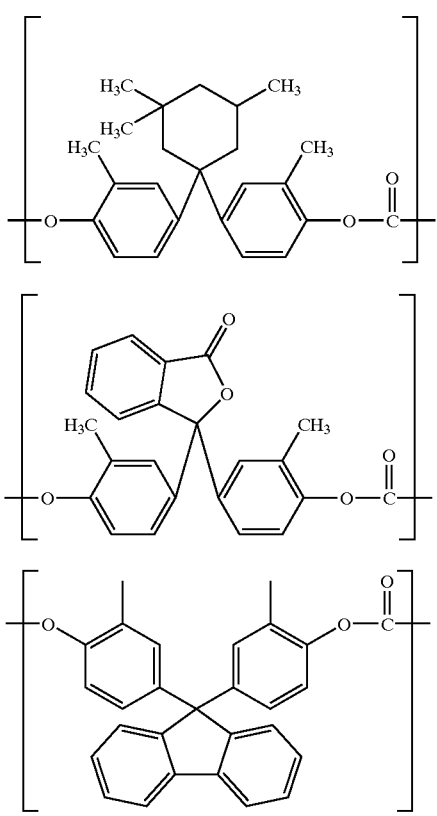

wherein the polycarbonate has a glass transition temperature of at least about 150° C.

The present invention further provides a polycarbonate composition comprising at least one compound of structure (I), (II), (III), (IV), or combinations thereof wherein the polycarbonate has a mechanical damping coefficient greater than about 0.04 at a temperature about 24° C. and a glass transition temperature greater than about 150° C.

The present invention further provides a method for improving the damping performance of an article, the method comprising constructing the article of a polycarbonate with at least one compound of structure (I), (II), (III), (IV), or combinations thereof wherein the polycarbonate has a mechanical damping coefficient greater than about 0.04 at a temperature about 24° C. and a glass transition temperature greater than about 150° C.

DETAILED DESCRIPTION OF THE INVENTION

Figure 1:
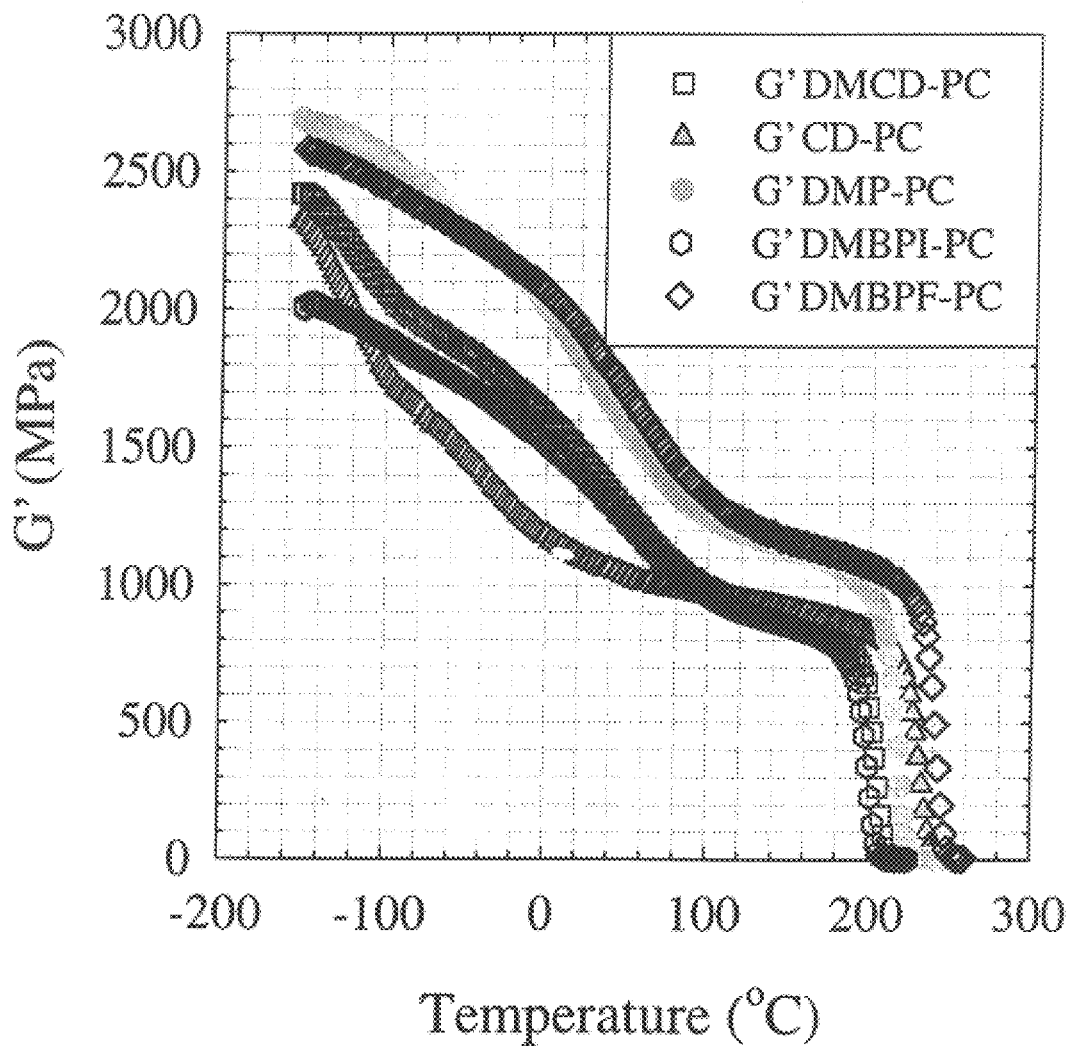
FIG. 1 is a plot of torsional storage modulus (G') of cyclododecyl-1,1-(bis-3-methyl-4-hydroxybenzene) polycarbonate (DMCD-PC), cyclododecyl-1,1-(bis-4-hydroxybenzene)polycarbonate (CD-PC), 3,3-bis(3-methyl-4-hydroxyphenyl)-(3H)-isobenzofuranone polycarbonate (DMP-PC), 3,3,5-trimethylcyclohexyl-1,1-(bis-3-methyl-4-hydroxybenzene)polycarbonate (DMBPI-PC), and fluorenylidene-9-(bis-3-methyl-4-hydroxybenzene) polycarbonate (DMBPF-PC).

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

"BPA" is bisphenol A or 2,2-bis(4-hydroxyphenyl) propane. BPA-PC is the polycarbonate made from the 2,2-bis(4-hydroxyphenyl)propane monomer.

"CD" is cyclododecyl-1,1-(bis-4-hydroxybenzene). CD-PC is the polycarbonate made from the cyclododecyl-1,1-(bis-4-hydroxybenzene)monomer.

"DMCD" is cyclododecyl-1,1-(bis-3-methyl-4-hydroxybenzene). DMCD-PC is the polycarbonate made from the cyclododecyl-1,1-(bis-3-methyl-4-hydroxybenzene)monomer.

"DMBPI" is 3,3,5-trimethylcyclohexyl-1,1-(bis-3-methyl-4-hydroxybenzene). DMPBI-PC is the polycarbonate made from the 3,3,5-trimethylcyclohexyl-1,1-(bis-3-methyl-4-hydroxybenzene)monomer.

"DMBPF" is fluorenylidene-9-(bis-3-methyl-4-hydroxybenzene). DMBPF-PC is the polycarbonate made from the fluorenylidene-9-(bis-3-methyl-4-hydroxybenzene)monomer.

"DMP" is 3,3-bis(3-methyl-4-hydroxyphenyl)-(3H)-isobenzofuranone. DMP-PC is the polycarbonate made from the 3,3-bis(3-methyl-4-hydroxyphenyl)-(3H)-isobenzofuranone monomer.

In the present invention, it was unexpectedly found that a substrate comprising polymers disclosed herein exhibits favorable glass transition temperatures and exhibits excellent damping characteristics. For effective damping, the material should absorb the energy, dissipate the energy, or combination thereof, of vibration transmitted through the material as heat energy converted as a result of planar shearing or bulk compression and expansion of the material.

The storage medium of the present invention comprises a polycarbonate comprising structural units (I), (II), (III), (IV),

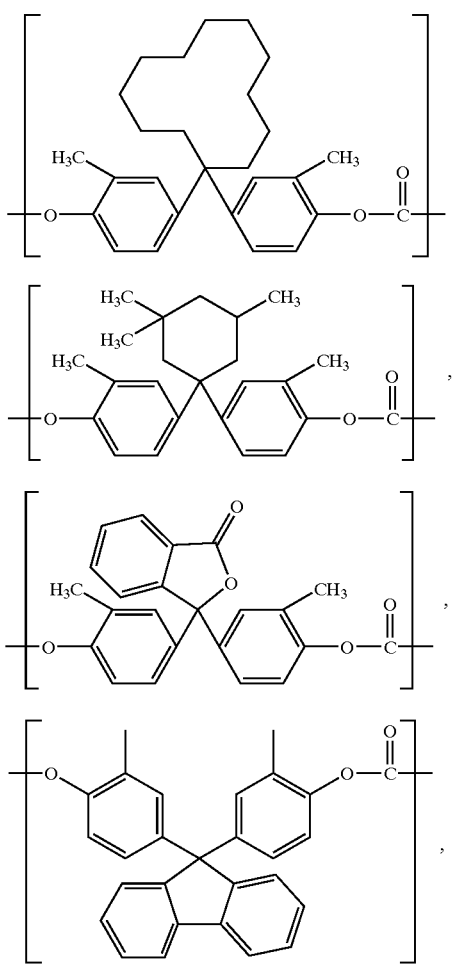

or combinations thereof, having excellent damping characteristics, a glass transition temperature greater than about 150° C. and are suitable for use in substrate applications. That is, the polycarbonate has sufficient thermal stability to prevent deformation during the deposition steps. In the present invention, the substrate typically has a mechanical damping coefficient defined as the ratio of the loss modulus over the storage modulus of greater than about 0.04, at a temperature of about 24° C., with a mechanical damping coefficient of greater than about 0.10 at a temperature of about 24° C. preferred, and a mechanical damping coefficient of greater than about 0.5 at a temperature of about 24° C. especially preferred at a frequency range between about 1 Hz and about 500 Hz. Mechanical damping is defined as the ratio of the loss modulus over the storage modulus. Viscoelastic materials, such as plastic resins have both a storage modulus, which represent elastic stiffness, and a loss modulus, which represent viscous stiffness.

The polycarbonate with carbonate structural units (I) is also known as cyclododecyl-1,1-(bis-3-methyl-4-hydroxybenzene) (DMCD-PC); carbonate structural units (II) is also known as 3,3,5-trimethylcyclohexyl-1,1-(bis-3-methyl-4-hydroxybenzene) (DMBPI-PC); carbonate structural units (III) is also known as 3,3-bis(3-methyl-4-hydroxyphenyl)-(3H)-isobenzofuranone (DMP-PC); and carbonate structural units (IV) is also known as fluorenylidene-9-(bis-3-methyl-4-hydroxybenzene) (DMBPF-PC).

The substrate of the present invention, comprising carbonate structural units (I), (II), (III), (IV), or combinations thereof, exhibit good pit replication and high surface quality. In part, this results from the fact that the material is monolithic and does not require the addition of fillers to the polymer. Preferably the substrate has at least a portion of its surface with a surface roughness of less than about 10 angstroms, and more preferably less than about 5 angstroms. Roughness is typically measured on average over a 10 micron by 10 micron area and measured using an atomic force microscope.

The weight average molecular weight ($M_W$) of the polycarbonate, as determined by gel permeation chromatography relative to polystyrene, is typically in a range between about 10,000 and about 100,000, more typically in a range between about 10,000 and about 50,000, even more typically in a range between about 12,000 and about 40,000.

The resin composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives. Examples of fillers or reinforcing agents include glass fibers, asbestos, carbon fibers, silica, talc and calcium carbonate. Examples of heat stabilizers include triphenyl phosphite, tris-(2,6-dimethylphenyl)phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, beeswax, montan wax and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

In addition to the plastic and colorant, the composition may optionally include various additives ordinarily incorporated in resin compositions of this type. Such additives may include antioxidants, heat stabilizers, anti-static agents (tetra alkylammonium benzene sulfonate salts, tetra alkylphosphonium benzene sulfonate salts, and the like), mold releasing agents (pentaerythritol tetrastearate; glycerol monstearate, and the like). and the like, and combinations comprising at least one of the foregoing. For example, the substrate can comprise about 0.01 to about 0.1 wt % of a heat stabilizer; about 0.01 to about 0.2 wt % of an antistatic agent; and about 0.1 to about 1 wt % of a mold releasing agent; based upon the total weight of the substrate.

Some possible antioxidants include, for example, organophosphites, e.g., tris(nonyl-phenyl)phosphite, tris(2,4-di-t-butylphenyl)phosphite, bis(2,4-di-t-butylphenyl) pentaerythritol diphosphite, distearyl pentaerythritol diphosphite and the like; alkylated monophenols, polyphenols and alkylated reaction products of polyphenols with dienes, such as, for example, tetrakis[methylene(3,5-di-tert-butyl-4-hydroxyhydrocinnamate)]methane, 3;5-di-tert-butyl-4-hydroxyhydrocinnamate octadecyl, 2,4-di-tert-butylphenyl phosphite, and the like; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, and the like; amides of beta-(3,5-di-tert-butyl-4-hydroxyphenyl)-propionic acid; and the like, as well as combinations comprising at least one of the foregoing.

Other potential additives which may be employed comprise: UV absorbers; stabilizers such as light and thermal stabilizers (e.g., acidic phosphorous-based compounds); hindered phenols; zinc oxide and/or zinc sulfide particles; lubricants (mineral oil, and the like), plasticizers, dyes (quinines, azobenzenes, and the like); among others, as well as combinations comprising at least one of the foregoing additives.

In order to aid in the processing of the plastic, particularly polycarbonate, catalyst(s) may also be employed, namely in the extruder or other mixing device. The catalyst typically assists in controlling the viscosity of the resulting material. Possible catalysts include hydroxides, such as tetraalkylammonium hydroxide, diethyldimethylammonium hydroxide, tetraalkylphosphonium hydroxide, tetrabutylphosphonium hydroxide, and the like, with diethyldimethylammonium hydroxide and tetrabutylphosphonium hydroxide preferred. The catalyst(s) can be employed alone or in combination with quenchers such as acids, such as phosphoric acid, and the like. Additionally, water may be injected into the polymer melt during compounding and removed as water vapor through a vent to remove residual volatile compounds.

The storage media of the present invention is useful in high areal density applications, first surface and similar applications, wherein an energy field incident on the data storage layer(s) contacts the data storage layer(s) without or at least prior to contacting the substrate. In other words, in contrast to conventional compact disks and similar applications, the energy field does not pass through the substrate to contact the data storage layer or reflect back through the substrate to the reading device. In order to function in such high areal density applications the storage media quality must exceed that of conventional compact discs and related media. The storage media, compared to conventional compact discs and similar media, should have a reduced axial displacement when excited by environmental vibrations, rotational vibrations, or combinations thereof, greater surface quality denoted by fewer irregularities or imperfections, and lower rotating moment of inertia (typically about 5.5 slug-in$^2$ or less, with about 4.5 slug-in$^2$ or less more typical, and about 4.0 slug-in$^2$ or less especially typical), among other qualities. Furthermore, the storage media typically comprises areal densities exceeding about 5 Gigabits per square inch (Gbits/in$^2$), with greater than about 20 Gbits/in$^2$ more typical, greater than about 50 Gbits/in$^2$ most typical, and up to or exceeding about 100 Gbits/in$^2$ anticipated.

Generally, in high areal density applications, i.e. about 5 Gbits/in$^2$ or greater, the read/write device is located relatively close to the surface of the storage medium (stand-off distance). In general, the higher the density sought, the closer the read/write device should be to the surface of the storage medium. Typically in these instances, the stand-off distance is generally less than about 0.3 millimeters (mm), and often less than about 760 nanometers (nm). For extremely high density, the read/write device is typically extremely close, e.g., less than about 0.064 microns ($\mu$), often less than about $0.013\mu$ from the surface. Consequently, the axial displacement of the substrate should be sufficiently less than a tolerable system axial displacement distance in order to prevent damage to the read/write device, storage medium surface during vibration, shock conditions, or combinations thereof. For example, for a disk (130 mm in outer diameter, 40 mm in inner diameter, and 1.2 mm in thickness) experiencing a sinusoidal gravitational loading of about 1 G (acceleration of gravity) and a resonant frequency of about 170 Hertz (Hz), an axial displacement in peak to peak measurement of less than about $250\mu$ is typical, with less than about $125\mu$ especially typical for instances when the primary concern is damage to the substrate, the read/write device, or combinations thereof. Typically, an axial displacement in peak to peak measurement of about $500\mu$ or less, with about $250\mu$ or less preferred, is maintained to a shock maximum of about 25 G's with an application time in a range between about 2 milliseconds and about 10 milliseconds (msec) and maintaining such a displacement to about 35 G's preferred. However, in other instances, e.g., those with a larger standoff distance (e.g., the stand-off at about $0.30\mu$ or more) damage to the head is not a dominating issue but rather, it is preferred to have a very low axial displacement, disk tilt, or combinations thereof to allow for the optics to remain in focus since they may be incapable of responding to rapid changes in focal length. Systems for reading data stored in substrate typically operate in a frequency range between about 1 Hz and about 500 Hz, and more typically in a range between about 100 Hz and about 200 Hz. Typically, the maximum radial tilt and tangential tilt are independently no more than about 1° each, and more typically less than about 0.30° each, measured in a resting state (i.e., not spinning).

The substrate axial displacement is a function of the disk size requirements (inner and outer radii, and thickness), its stiffness (flexural modulus) and density, Poisson's ratio, loss modulus, and storage modulus. As the disk's outer radius increases, the axial displacement of the disk under shock increases. As the disk thickness decreases, its sectional stiffness decreases while its axial displacement increases. Currently, the dimensions of storage medium are specified by the industry to enable their use in presently available storage medium reading/writing devices. The storage medium typically has an inner diameter in a range between about 15 mm and about 40 mm, an outer diameter in a range between about 65 mm and about 130 mm, an overall thickness in a range between about 0.8 mm and about 2.5 mm with a thickness up to about 1.2 mm typically preferred. Other diameters and thickness may be employed to obtain a stiffer architecture if necessary.

The storage media described herein can be employed in conventional optic, magneto-optic, and magnetic systems, as well as in advanced systems requiring higher quality storage medium, high areal density, or combinations thereof. During use, the storage medium is disposed in relation to a read/write device such that energy (for instance, magnetic, light, electric, or a combination) contacts the data storage layer in the form of an energy field incident on the storage medium. The energy field contacts the data storage layer(s) disposed on the storage medium. The energy field causes some physical or chemical change in the storage medium so as to record the incidence of the energy at that point on the layer. For example, an incident magnetic field might change the orientation of magnetic domains within the layer or an incident light beam could cause a phase transformation where the light heats the material.

Numerous methods may be employed to produce the storage medium including, but not limited to, injection molding, foaming processes, sputtering, plasma vapor deposition, vacuum deposition, electro deposition, spin coating, spray coating, meniscus coating, data stamping, embossing, surface polishing, fixturing, laminating, rotary molding, two shot molding, coinjection, over-molding of film, microcellular molding, and combinations thereof. Typically, the technique employed enables in situ production of the substrate having the desired features, for example, pits and grooves. One such process comprises an injection molding-compression technique where a mold is filled with a molten polymer as defined herein. The mold may contain a preform, insert. etc. The polymer system is cooled and, while still in at least partially molten state, compressed to imprint the desired surface features arranged in spiral, concentric, or other orientation onto the desired portions of the substrate, i.e., one or both sides in the desired areas. The substrate is then cooled to room temperature.

For magnetic data storage on a substrate, information stored is stored as at least one data layer on the surface of the substrate. This information may be imprinted directly onto the surface as pits, grooves, or combinations thereof (as in the case of a compact disc) or stored in a photo-, thermal-, or magnetically-definable medium which has been deposited onto the surface of the substrate.

The polycarbonates of the present invention may be prepared by the interfacial process, the melt process, or solid state process. If the interfacial process is used, the addition of various phase transfer catalysts is optional. Phase transfer catalysts which are suitable include, but are not limited to, tertiary amines, such as triethylamine; ammonium salts, such as tetrabutylammonium bromide; hexaethylguanidium chloride; or combinations thereof. Monofunctional phenols, such as p-cumylphenol and 4-butylphenol; long chain alkylphenols, such as cardanol and nonyl phenol; and difunctional phenols may be used as chain stopping agents. Optionally, chain stopping agent may be incorporated into the polycarbonate based on the total moles of the repeating units in a range between about 0.1 mol % and about 10 mol %, more typically in a range between about 1 mol % and about 5 mol %.

The interfacial process includes the use of a carbonate precursor such as phosgene. In some instances with the interfacial process, the phosgenation conditions must be adjusted. In particular, the phosgenation conditions should be adjusted in cases where the formation of undesired cyclic oligomers is favored by the characteristic reactivity of the monomer which is related to monomer solubility in the reaction medium and monomer structure.

The polycarbonates of the present invention may also be prepared by the melt or transesterification process. This process does not require the use of phosgene or a solvent and minimizes the formation of low molecular weight contaminants, such as cyclic and linear low molecular weight oligomers in the final polymer. The monomers are mixed with a carbonate source, such as a diarylcarbonate, and a small amount of catalyst, such as an alkali metal hydroxide or ammonium hydroxide, and heated under a vacuum according to a protocol in which the temperature is raised through a series of stages while the pressure in the headspace over the reaction mixture is lowered from ambient pressure to about 1 torr.

Suitable carbonate sources, catalysts, and reaction conditions are found in U.S. Pat. No. 5,880,248, *and Kirk-Othmer Encyclopedia of Chemical Technology,* Fourth Edition, Volume 19, pp. 585–600. The time of the stages and the temperature are such that mechanical losses of material through foaming and the like are avoided. Phenol and excess diphenyl carbonate are removed overhead to complete the polymerization process. The product high-polymer is then isolated as a melt which may be compounded with other additives, such as stabilizers and mold release agents, prior to pelletization. The products produced by the melt process have reduced numbers of undissolved particles and reduced content of low molecular weight contaminants, such as cyclic oligomers, relative to the interfacially produced product.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in degrees Celsius (°C.) or is at room temperature, and pressure is at or near atmospheric.

The materials and testing procedures used for the results shown herein are as follows:

Preparation of DMCD Homopolycarbonate

Into a 500 milliliter (mL) Morton flask was placed DMCD (19.0 g, 50 mmol), 90 mL methylene chloride and 90 mL of water. The pH was adjusted to 10.5–11.0 with 50 weight % sodium hydroxide (NaOH). Phosgene was added at 0.6 grams per minute (g/min), at 5.0 g (50 mmol), p-cumylphenol (0.43 g, 4 mol %) was added and phosgene was continued until 6.0 g (20 mol % excess) was added. The pH was lowered to 10.5 (with phosgene) at which point 50 μL of triethylamine (TEA) was added followed 3 minutes later with 50 μL more TEA. After the chloroformates were gone, an additional 3.5 g of phosgene was added. The reaction mixture was tested for chloroformates. If present, they were hydrolyzed by addition of DMBA (10 μL) (dimethylbutylamine). The polymer solution was separated from the brine, washed with aqueous hydrochloric acid (HCl), washed with water and steam crumbed in a blender. Mw=39,300 (Polystyrene standards), $T_g$=197° C.

Preparation of DMBPI Homopolycarbonate

Into a 500 mL Morton flask was placed DMBPI (16.9 g, 50 mmol), 100 mL methylene chloride and 80 mL of water. The pH was adjusted to 12.5 with 50 weight % NaOH. Phosgene was added at 0.6 g/min, at 5.0 g (50 mmol), p-cumylphenol (0.21 g, 2 mol %) was added and phosgene was continued until 6.0 g (20 mol % excess) was added. The pH was lowered to 10.5 (with phosgene) at which point 25 μL of TEA was added followed 5 minutes later with 25 μL more TEA. After the chloroformates were gone, an additional 25 μL of TEA was added (125 μL total, about 1 mol %) followed by 3.5 g more phosgene. The reaction mixture was tested for chloroformates. If present they were hydrolyzed by addition of DMBA (5 μL) (dimethylbutylamine). The polymer solution was separated from the brine, washed with aqueous HCl, washed with water and steam crumbed in a blender. Mw=46,100 (Polystyrene standards), $T_g$=196° C.

Preparation of DMBPF Homopolycarbonate

Into a 500 mL Morton flask was placed DMBPF (18.9 g, 50 mmol), 90 mL methylene chloride and 90 mL of water. The pH was adjusted to 11.5 with 50 weight % NaOH. Phosgene was added at 0.6 g/min, at 5.0 g (50 mmol), p-cumylphenol (0.43 g, 4 mol %) was added and phosgene was continued until 6.0 g (20 mol % excess) was added. The pH was lowered to 10.5 (with phosgene) at which point 50 μL of TEA was added followed 3 minutes later with 50 μL more TEA. After the chloroformates were gone, an additional 2.25 g of phosgene was added. The reaction mixture was tested for chloroformates. If present they were hydrolyzed by addition of DMBA (5 μL) (dimethylbutylamine). The polymer solution was separated from the brine, washed with aqueous HCl, washed with water and steam crumbed in a blender. Mw=29,400 (Polystyrene standards), $T_g$=237° C.

Preparation of DMP Homopolycarbonate

Into a 500 mL Morton flask was placed DMP (34.6 g, 100 mmol), 90 mL methylene chloride and 90 mL of water. The pH was adjusted to 10.0 with 50 weight % NaOH. Phosgene was added at 0.6 g/min, at 9.5 g (95 mmol), p-cumylphenol (0.64 g, 3 mol %) was added and phosgene was continued until 12.1 g (20 mol % excess) was added. The pH was lowered to 10.5 (with phosgene) at which point 75 μL of TEA was added followed 3 minutes later with 73 μL more TEA. After the chloroformates were gone, an additional 3.5 g of phosgene was added. The reaction mixture was tested for chloroformates. If present they were hydrolyzed by addition of DMBA (10 μL) (dimethylbutylamine). The polymer solution was separated from the brine, washed with aqueous HCl, washed with water and steam crumbed in a blender. Mw=61,300 (Polystyrene standards), $T_g$=218° C.

Figure 2:
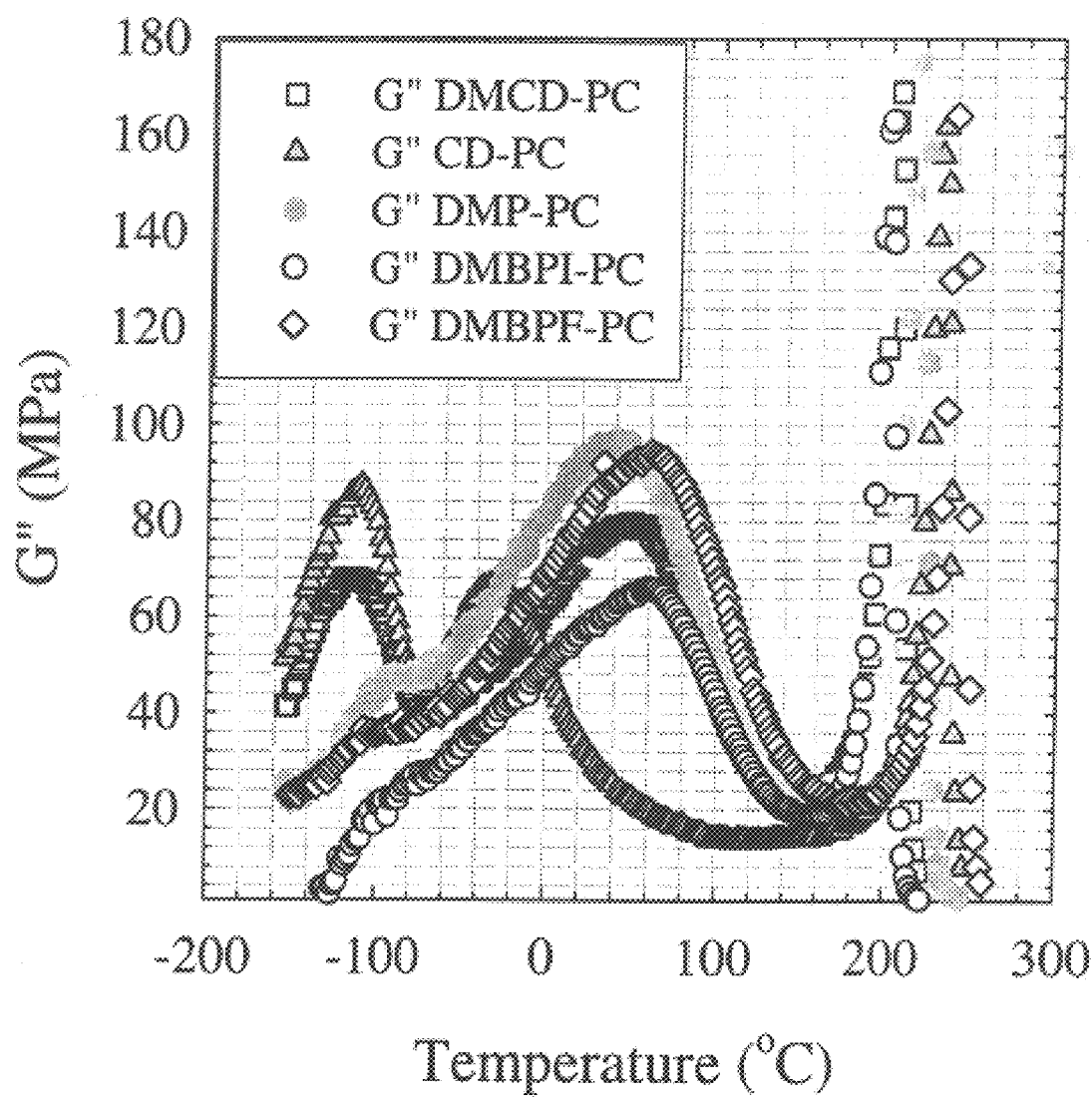
FIG. 2 is a plot of torsional loss modulus (G") of cyclododecyl-1,1-(bis-3-methyl-4-hydroxybenzene) polycarbonate (DMCD-PC), cyclododecyl-1,1-(bis-4-hydroxybenzene)polycarbonate (CD-PC), 3,3-bis(3-methyl-4-hydroxyphenyl)-(3H)-isobenzofuranone polycarbonate (DMP-PC), 3,3,5-trimethylcyclohexyl-1,1-(bis-3-methyl-4-hydroxybenzene)polycarbonate (DMBPI-PC), and fluorenylidene-9-(bis-3-methyl-4-hydroxybenzene) polycarbonate (DMBPF-PC).

FIGS. 1 and 2 are plots of the loss and storage modulii measured from torsional dynamic mechanical measurements of several polycarbonates. A large beta-relaxation in the loss modulus near room temperature indicates a useful damping material (the peak-to-peak axial displacement is proportional to the inverse of the loss modulus).

Torsional modulus measurements on the various material systems given above were conducted on a RHEOMETRICS DYNAMIC SPECTROSCOPE (model 7700) using a torsion rectangular fixture. The specimen used for these tests were nominally 2.5 inches long, 0.5 inches wide and 0.125 inches thick. The specimens were prepared by compression molding. All tests were conducted with the specimen being subjected to 0.1% strain at a frequency of 10 radians per second. The samples were subjected to a thermal scan cycle from −150° C. to 150° C. at a heating rate of 2° C. per minute. The applied strain and load were measured continuously during the test and the storage modulus (G'), loss modulus (G") and tangent loss (tan δ) were calculated from this data.

The achievable gains from high modulus and damping was qualified by the transfer function which predicts the peak-to-peak axial displacements as:

$$\delta_{max} Peak - Peak = \frac{nc\gamma(1-v)}{2E''h^2}, \text{ and}$$

$$\omega_{m1} = b\sqrt{\frac{E'h^2}{\gamma(1-v^2)}}$$

where b and c were constants obtained independent of material properties from finite element analysis, E' was the storage modulus, E" (loss modulus) was a measure of material damping, v the Poissons ratio, γ the specific Gravity, h the disk thickness, $\omega_{m1}$ the first modal frequency, and n was the peak to peak "g" (acceleration) loading. The values for E', E", and tan delta were obtained from the Figures to determine the dispersion and frequency of the respective materials. Table 1 is a summary of the results of the predicted values of axial displacement and natural frequency based on G' and G" measurements in torsion obtained at 25° C.

TABLE 1

| | Frequency 1.59 Hertz | | | | |
|---|---|---|---|---|---|
| System | E' (psi) | E" (psi) | Tan delta | Displacement (inches) | Frequency (Hertz) |
| DMCD-PC | 5.84 × 10⁵ | 2.99 × 10⁴ | 5.12 × 10⁻² | 0.007075 | 231.84 |
| CD-PC | 4.39 × 10⁵ | 1.29 × 10⁴ | 2.94 × 10⁻² | 0.016405 | 201.01 |
| DMP-PC | 7.30 × 10⁵ | 3.70 × 10⁴ | 5.07 × 10⁻² | 0.005725 | 259.03 |
| DMBPI-PC | 5.60 × 10⁵ | 2.34 × 10⁴ | 4.18 × 10⁻² | 0.009036 | 226.99 |
| DMBPF-PC | 7.66 × 10⁵ | 3.38 × 10⁴ | 4.41 × 10⁻² | 0.006264 | 265.39 |
| BPA-PC | 4.28 × 10⁵ | 3.11 × 10³ | 7.27 × 10⁻³ | 0.068043 | 198.39 |
| DMB-PC | 5.79 × 10⁵ | 3.48 × 10⁴ | 6.01 × 10⁻² | 0.006081 | 230.75 |

It is clear from these results of the predicted vibration response of the 120 mm disks that the maximum axial displacement of disks were significantly reduced under vibration loading in DMCD-PC, DMP-PC, DMBPI-PC, and DMBPF-PC in comparison to BPA-PC and CD-PC.

While typical embodiments have been set forth for the purpose of illustration, the foregoing descriptions should not be deemed to be a limitation on the scope of the present invention. Accordingly, various modifications, adaptations, and alternatives may occur to one skilled in the art without departing from the spirit and scope of the present invention.

What is claimed is:

1. A storage medium for data, the storage medium comprising:
   1) a substrate comprising at least one polycarbonate portion, and
   2) at least one data layer on the substrate;
   the polycarbonate comprising at least one compound of structure (I), (II), (III), (IV), or combinations thereof:

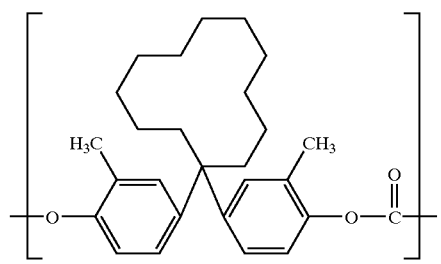

(I)

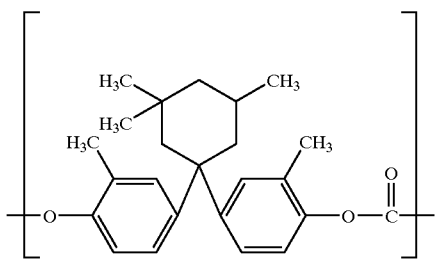

(II)

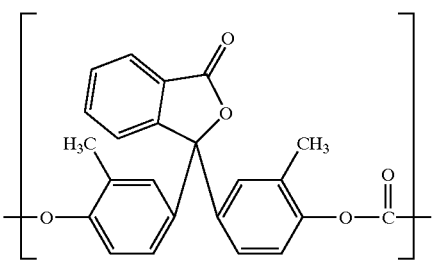

(III)

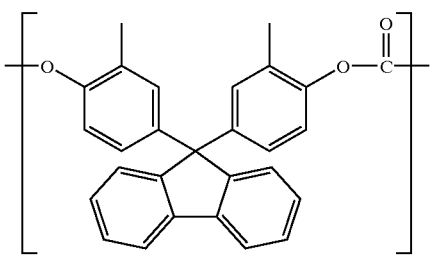

(IV)

wherein the polycarbonate has a glass transition temperature greater than about 150° C.

2. The storage medium in accordance with claim 1, wherein the polycarbonate comprises structure (I).

3. The storage medium in accordance with claim 1, wherein the polycarbonate comprises structure (II).

4. The storage medium in accordance with claim 1, wherein the polycarbonate comprises structure (III).

5. The storage medium in accordance with claim 1, wherein the polycarbonate comprises structure (IV).

6. The storage medium in accordance with claim 1, wherein the polycarbonate has a mechanical damping coefficient greater than about 0.04 at a temperature of about 24° C.

7. The storage medium in accordance with claim 6, wherein the polycarbonate has a mechanical damping coefficient greater than about 0.1 at a temperature of about 24° C.

8. The storage medium in accordance with claim 7, wherein the polycarbonate has a mechanical damping coefficient greater than about 0.5 at a temperature of about 24° C.

9. The storage medium in accordance with claim 1, wherein the polycarbonate has a weight average molecular weight in a range between about 10,000 and about 100,000 relative to polystyrene.

10. The storage medium in accordance with claim 9, wherein the polycarbonate has a weight average molecular weight in a range between about 10,000 and about 50,000 relative to polystyrene.

11. The storage medium in accordance with claim 10, wherein the polycarbonate has a weight average molecular weight in a range between about 12,000 and about 40,000 relative to polystyrene.

12. A storage medium for data, the storage medium comprising:
    1) a substrate comprising at least one polycarbonate portion, and
    2) at least one data layer on the substrate;
    the polycarbonate portion comprising residues of structure (I):

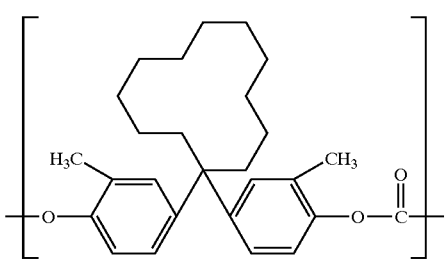

(I)

wherein the polycarbonate has the glass transition temperature greater than about 150° C. and a mechanical damping coefficient greater than about 0.04 at a temperature of about 24° C.

13. A storage medium for data, the storage medium comprising:
    1) a substrate comprising at least one polycarbonate portion, and
    2) at least one data layer on the substrate;
    the polycarbonate portion comprising residues of structure (II):

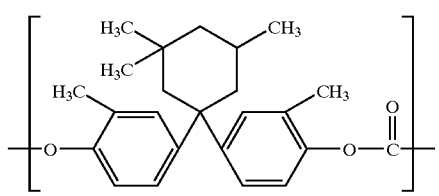

(II)

wherein the polycarbonate has the glass transition temperature greater than about 150° C. and a mechanical damping coefficient greater than about 0.04 at a temperature of about 24° C.

14. A storage medium for data, the storage medium comprising:

1) a substrate comprising at least one polycarbonate portion, and
2) at least one data layer on the substrate;

the polycarbonate portion comprising residues of structure (III):

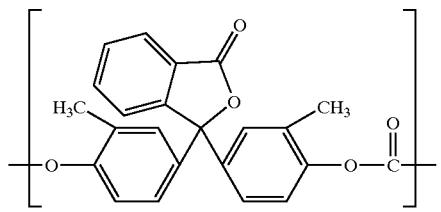

(III)

wherein the polycarbonate has the glass transition temperature greater than about 150° C. and a mechanical damping coefficient greater than about 0.04 at a temperature of about 24° C.

15. A storage medium for data, the storage medium comprising:

1) a substrate comprising at least one polycarbonate portion, and
2) at least one data layer on the substrate;

the polycarbonate portion comprising residues of structure (VI):

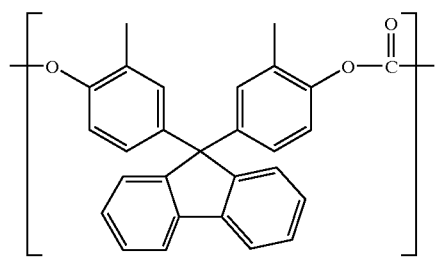

(IV)

wherein the polycarbonate has a glass transition temperature greater than about 150° C. and a mechanical damping coefficient greater than about 0.04 at a temperature of about 24° C.

16. A polycarbonate composition with improved damping performance which comprises at least one compound of structure (I), (II), (III), (IV), or combinations thereof:

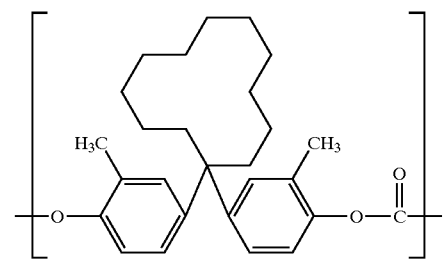

(I)

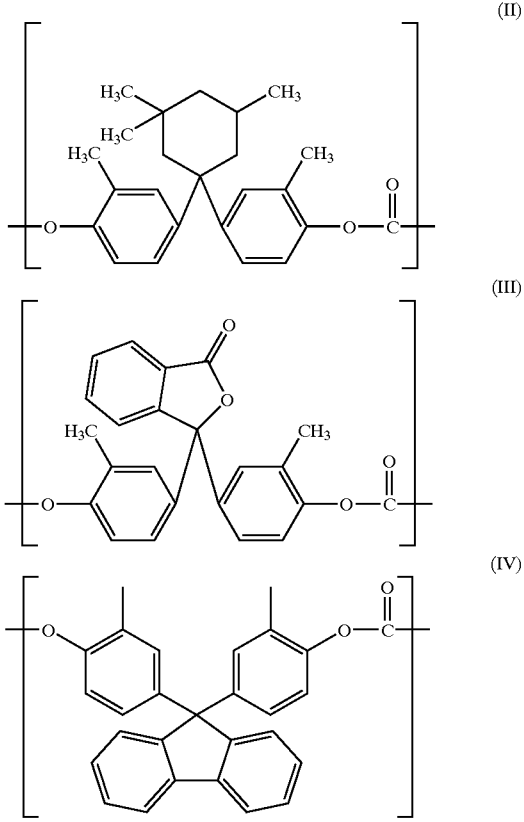

wherein the polycarbonate has a mechanical damping coefficient greater than about 0.04 at a temperature about 24° C. and a glass transition temperature greater than about 150° C.

17. The polycarbonate composition in accordance with claim 16, which comprises structure (I).

18. The polycarbonate composition in accordance with claim 16, which comprises structure (II).

19. The polycarbonate composition in accordance with claim 16, which comprises structure (III).

20. The polycarbonate composition in accordance with claim 16, which comprises structure (IV).

21. The polycarbonate composition in accordance with claim 16, wherein the polycarbonate has a weight average molecular weight in a range between about 10,000 and about 100,000 relative to polystyrene.

22. The polycarbonate composition in accordance with claim 21, wherein the polycarbonate has a weight average molecular weight in a range between about 10,000 and about 50,000 relative to polystyrene.

23. The polycarbonate composition in accordance with claim 22, wherein the polycarbonate has a weight average molecular weight in a range between about 12,000 and about 40,000 relative to polystyrene.

24. The polycarbonate composition in accordance with claim 16, wherein the polycarbonate has a mechanical damping coefficient greater than about 0.1 at a temperature of about 24° C.

25. The polycarbonate composition in accordance with claim 24, wherein the polycarbonate has a mechanical damping coefficient greater than about 0.5 at a temperature of about 24° C.

26. A polycarbonate composition with improved damping performance which comprises a compound of structure (I):

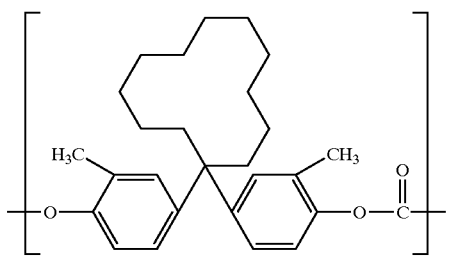
(I)

wherein the polycarbonate has a mechanical damping coefficient greater than about 0.04 at a temperature about 24° C. and a glass transition greater than about 150° C.

27. A polycarbonate composition with improved damping performance which comprises a compound of structure (II):

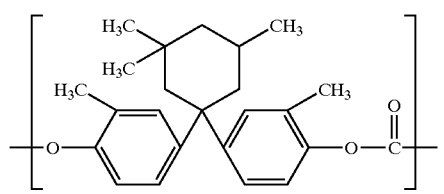
(II)

wherein the polycarbonate has a mechanical damping coefficient greater than about 0.04 at a temperature about 24° C. and a glass transition temperature greater than about 150° C.

28. A polycarbonate composition with improved damping performance which comprises a compound of structure (III):

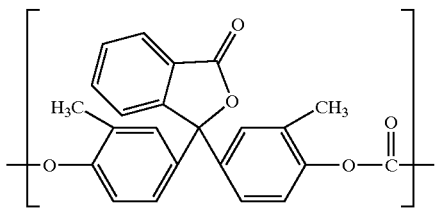
(III)

wherein the polycarbonate has a mechanical damping coefficient greater than about 0.04 at a temperature about 24° C. and a glass transition temperature greater than about 150° C.

29. A polycarbonate composition with improved damping performance which comprises a compound of structure (IV):

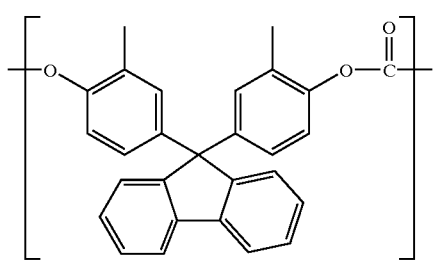
(IV)

wherein the polycarbonate has a mechanical damping coefficient greater than about 0.04 at a temperature about 24° C. and a glass transition temperature greater than about 150° C.

30. A method for improving the damping performance of an article, the method comprising constructing the article of a polycarbonate with at least one compound of structure (I), (II), (III), (IV), or combinations thereof:

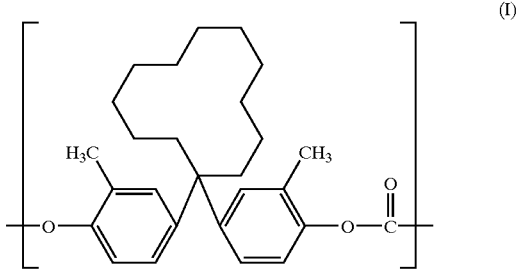
(I)

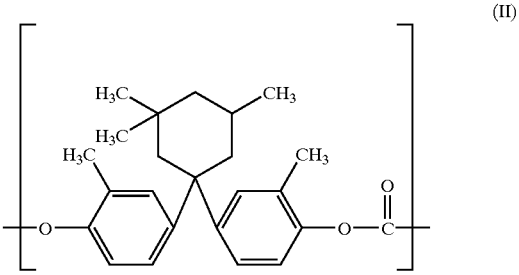
(II)

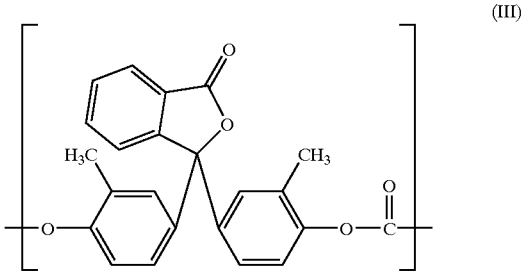
(III)

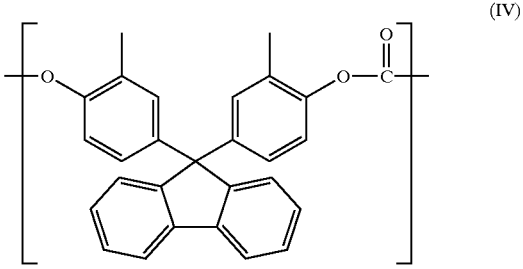
(IV)

wherein the polycarbonate has a mechanical damping coefficient greater than about 0.04 at a temperature of about 24° C. and a glass transition temperature greater than about 150° C.

31. The method in accordance with claim 30, wherein the polycarbonate comprises structure (I).

32. The method in accordance with claim 30, wherein the polycarbonate comprises structure (II).

33. The method in accordance with claim 30, wherein the polycarbonate comprises structure (III).

34. The method in accordance with claim 30, wherein the polycarbonate comprises structure (IV).

35. The method in accordance with claim 30, wherein the polycarbonate has a mechanical damping coefficient greater than about 0.1 at a temperature of about 24° C.

36. The method in accordance with claim 35, wherein the polycarbonate has a mechanical damping coefficient greater than about 0.5 at a temperature of about 24° C.

37. The method in accordance with claim 30, wherein the polycarbonate has a weight average molecular weight in a range between about 10,000 and about 100,000 relative to polystyrene.

38. The method in accordance with claim 37, wherein the polycarbonate has a weight average molecular weight in a range between about 10,000 and about 50,000 relative to polystyrene.

39. The method in accordance with claim 38, wherein the polycarbonate has a weight average molecular weight in a range between about 12,000 and about 40,000 relative to polystyrene.

40. The method in accordance with claim 30, wherein the article comprises a storage medium for data.

41. A method for improving the damping performance of a storage medium for data, the method comprising constructing the storage medium of a polycarbonate with a compound of structure (I):

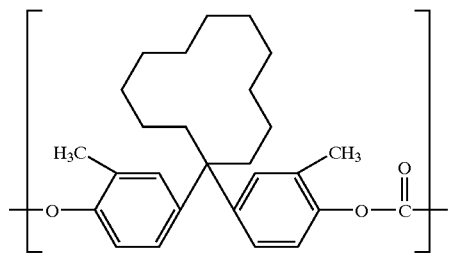

(I)

wherein the polycarbonate has a mechanical damping coefficient greater than about 0.04 at a temperature of about 24° C. and a glass transition temperature greater than about 150° C.

42. A method for improving the damping performance of a storage medium for data, the method comprising constructing the storage medium of a polycarbonate with a compound of structure (II):

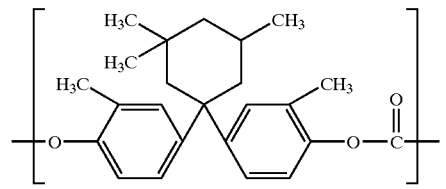

(II)

wherein the polycarbonate has a mechanical damping coefficient greater than about 0.04 at a temperature of about 24° C. and a glass transition temperature greater than about 150° C.

43. A method for improving the damping performance of a storage medium for data, the method comprising constructing the storage medium of a polycarbonate with a compound of structure (III):

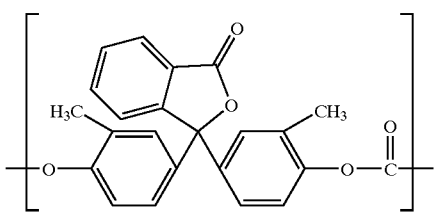

(III)

wherein the polycarbonate has a mechanical damping coefficient greater than about 0.04 at a temperature of about 24° C. and a glass transition temperature greater than about 150° C.

44. A method for improving the damping performance of a storage medium for data, the method comprising constructing the storage medium of a polycarbonate with a compound of structure (IV):

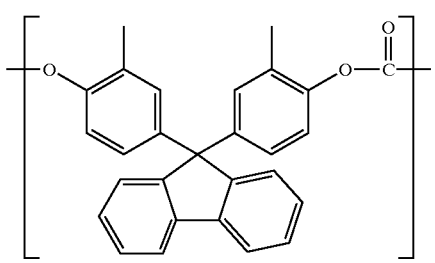

(IV)

wherein the polycarbonate has a mechanical damping coefficient greater than about 0.04 at a temperature of about 24° C. and a glass transition temperature greater than about 150° C.

* * * * *